No. 853,704. PATENTED MAY 14, 1907.
T. LEWICKI.
CLARIFIER.
APPLICATION FILED AUG. 5, 1905.

2 SHEETS—SHEET 1.

WITNESSES
Henry J. Suhrbier.
Fannie Fisk

INVENTOR
Taddäus Lewicki
BY
ATTORNEYS.

No. 853,704. PATENTED MAY 14, 1907.
T. LEWICKI.
CLARIFIER.
APPLICATION FILED AUG. 5, 1905.

2 SHEETS—SHEET 2.

WITNESSES
Henry J. Sulotier.
Fannie Fisk

INVENTOR
Taddäus Lewicki
BY Goepel
ATTORNEYS.

UNITED STATES PATENT OFFICE.

TADDÄUS LEWICKI, OF WARSAW, RUSSIA, ASSIGNOR TO CARL HANNING, OF FRANKENSTEIN, SILESIA, GERMANY.

CLARIFIER.

No. 853,704.  Specification of Letters Patent.  Patented May 14, 1907.

Application filed August 5, 1905. Serial No. 272,884.

*To all whom it may concern:*

Be it known that I, TADDÄUS LEWICKI, a subject of the Emperor of Russia, residing at Warsaw, in the Empire of Russia, have invented a new and useful Clarifier, of which the following is a specification.

There are known clarifiers, in which compartments are arranged side by side or one above the other for dividing the liquid to be clarified into a number of portions and thereby reducing its speed, so that a better clarifying effect may be obtained. Such clarifiers, however, present certain defects. Their supplies or discharges are too narrow, so that the liquid enters or leaves the clarifier at too great a speed. During its passage through the clarifier its speed may be irregular, particularly in conical clarifiers, so that the formation of objectionable whirls cannot be avoided.

My invention relates to improvements in open clarifiers with conical bottoms and sediment discharges, whereby the said defects are removed. The speed of the liquid is so much reduced as to facilitate the separation of the suspended matters in a perfectly safe manner, while the formation of all whirls is avoided, so that the clarifier is rendered more effective than hitherto. The clarifier may be so arranged, that the separated suspended matters may be used as a filter.

The objects of my improvement are, first, to provide long inlet and outlet troughs in the several compartments about on the level of the liquid; second, to connect them with the supply and the discharge respectively on opposite sides; third, to provide, where required, along the inlet troughs other troughs for collecting matters of a smaller specific weight; and, fourth, where so preferred, to close each pair of adjoining compartments with a downwardly bent plate, in which an adjustable throttle valve is provided. I attain these objects by the constructions illustrated in the accompanying drawings, in which—

Figure 1:
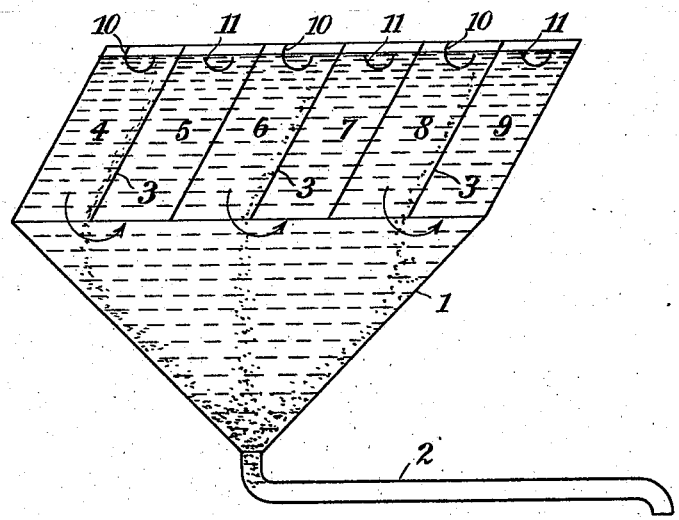
Figure 2:
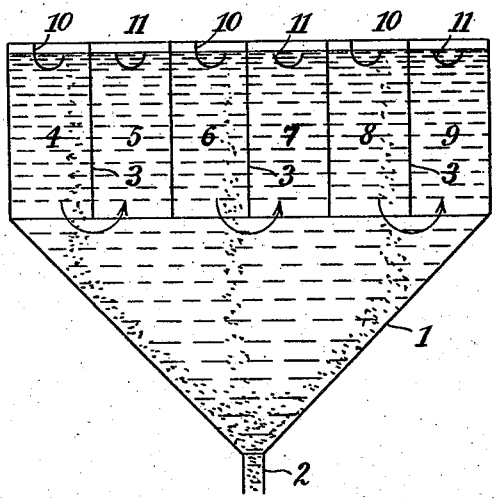
Figure 3:
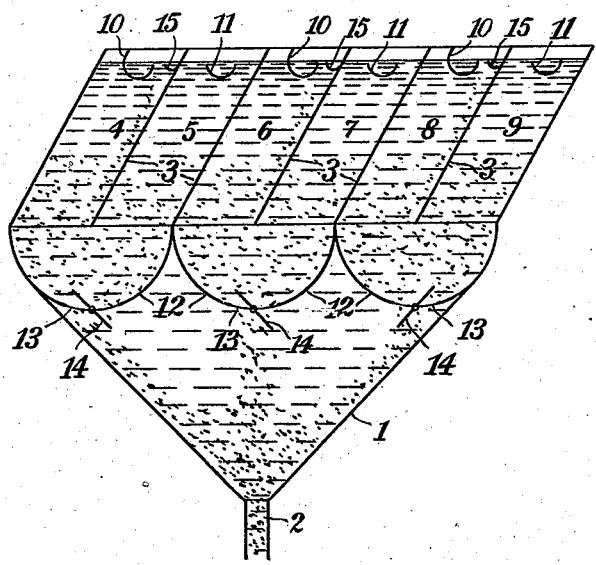
Figure 4:
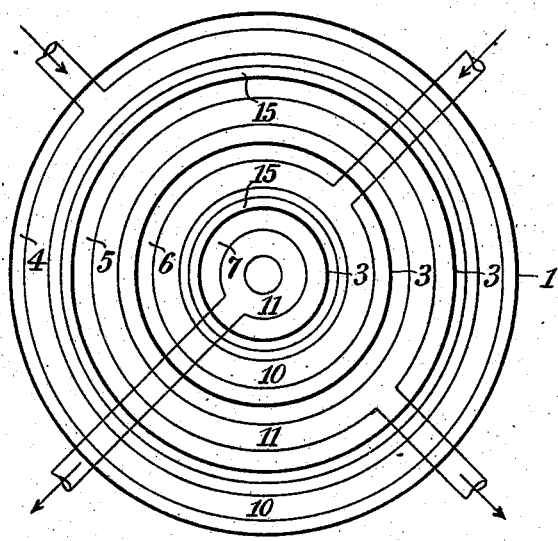

Figure 1 is a vertical cross section through an open clarifier with inclined longitudinal walls and parallel partitions, Fig. 2 is a vertical cross section through an open clarifier with vertical longitudinal walls and parallel partitions, Fig. 3 is a vertical cross section through an open clarifier with inclined longitudinal walls and partitions, in which each pair of compartments is below closed with a curved plate provided with an adjustable discharging valve, and Fig. 4 is a plan of a round open clarifier with four concentric compartments.

Similar characters of reference refer to similar parts throughout the several views.

Fig. 1 shows a preferably square or rectangular open clarifier 1 with inclined parallel walls in the longitudinal direction (at right angles to the plane of the paper), vertical end walls in the cross direction, a conical or pyramidal bottom tapering downwardly and a discharge tube 2. Above the bottom the clarifier 1 is divided by an odd number of equidistant partitions 3, 3 parallel to the inclined walls into an even number of spaces 4, 5, 6, 7, 8 and 9. Every two neighboring spaces 4 and 5, 6 and 7, 8 and 9 are assumed to form a portion or section of the clarifier, so that there are in all three portions in the clarifier. On or near the water level longitudinal troughs 10 and 11 are disposed in the clarifier, of which the inlet troughs 10, 10 are connected through the one end wall, say on the front, with the supply tube or tubes (not shown) and the outlet troughs 11, 11 are connected through the other end wall, say on the rear, with the discharge tube or tubes equally not shown. Thus each assumed portion of the clarifier has a partition 3, an inlet trough 10 and an outlet trough 11, the two troughs being connected on opposite sides with the supply and the discharge respectively. The inlet troughs 10 may be so arranged, that their (right) edges nearer to the partitions 3 are just below the level of the liquid, while their other (left) edges project above the level. As all the troughs 10 and 11 extend over either the whole length of the clarifier or the most part of the same, it is evident, that the speed of the liquid passing over the edges of the inlet troughs 10 in the cross direction will be very much slower than in the supply tube or tubes. This speed of the liquid will be further considerably reduced during the passage of the liquid through the spaces 4, 6 and 8 downward, seeing that the area of each space is much larger than that between the edge of the inlet troughs 10 and the level of the liquid. The outlet troughs 11 may be so arranged, that their two edges are just below the level of the liquid. Then the speed of the liquid passing over both edges of each outlet trough will be of course half the speed of the liquid passing over the one edge of the inlet trough, in other words, it will be still very slow, although it is greater than in the passages 5, 7 and 9.

The clarifier operates as follows: The dirty liquid passes from the supply through the several inlet troughs 10 and flows over their right edges at a very slow speed, so that the suspended matters are easily separated by their own weight from the liquid and fall on the partitions 3, 3 along which they slide down, until they fall through the space above the bottom. They collect on the inclined faces of the bottom, glide down the same and escape through the discharge tube 2 either continuously or periodically if there is a cock or valve, which may be opened from time to time. The partly clarified liquid slowly goes downward in the respective space 4, 6 or 8 of each assumed portion of the clarifier and turns round the lower edge of the partition 3 in the direction of the arrow. Its speed being so very slight it does not disturb at all the stream of the falling separated matters (see Fig. 1), but easily passes through the same. No whirls will be anywhere formed, so that the clarifying process is facilitated. During the upward motion of the liquid in the other space 5, 7 or 9 of the assumed portion of the clarifier it may be further clarified, as all the suspended matters still left are permitted to sink down. The perfectly clarified liquid flows over the two edges of the respective outlet trough 11 and passes in the latter until it escapes through the discharge tube or tubes.

It is preferable, that the inlet trough 10 of each assumed portion of the clarifier be connected with the supply on the one end wall of the clarifier and that the outlet trough 10 be connected with the discharge on the other end wall, as in this case the liquid will be better clarified. For it may be, that the greater part of the suspended matters will flow over with the liquid in the front part of the inlet trough, so that the liquid will be clearer in the rear part of the space 4, 6 or 8 respectively, than in the front part. From this it follows, that also the liquid in the rear part of the other space 5, 7 or 9 respectively will be clearer than in the front part of this space. This clearer liquid will flow into the rear part of the outlet trough 11 and escape direct into the discharge.

The clarifier may be divided into as many portions, or sections as desired, and the path of the liquid in each portion is comparativley short, so that the speed of the liquid everywhere in the clarifier may be made extremely small. The separated matters will therefore form a uniform or regular layer, which cannot be disturbed by the moving liquid, much less so, as there are no whirls whatever.

The partitions 3, 3 and the longitudinal walls of the clarifier 1 may also be vertical, as is shown at Fig. 2, if this is preferred.

When the separated matters form a suitable filter, the clarifier shown at Fig. 1 may be modified in the manner illustrated in Fig. 3. Each pair of compartments is closed at its lower part by a downwardly curved plate 12, extending between opposite walls of the vessel and connecting alternate partitions at the bottom edges of the latter. In the middle part of each plate 12 an adjustable throttle valve 14 is disposed and arranged to be adjusted from without in any known manner. This throttle valve is preferably made to extend over the whole length of the clarifier. The so modified clarifier operates as follows: In the one space 4, 6 or 8 respectively of each portion of the clarifier the suspended matters are separated by their own weight, fall on the inclined partitions 3, slide down the same and collect on the bent plate 12, until a layer reaching the lower edge of the partition 3 is formed, the throttle valve 14 being closed. At this moment the throttle valve 14 may be opened and so adjusted that it permits a quantity of separated matters to fall through on the bottom during a period, while the same quantity of matters is being separated above. The separated matters on the bent plate 12 will now serve as a filter, through which the liquid passes before it ascends in the other space 5, 7 or 9 respectively. The clarified liquid flows over the two edges of the outlet trough 11 and escapes in the manner explained above. The separated matters collected on the bottom are equally discharged as before, either continuously or periodically. By regulating the throttle valves 14, 14 the height of the filters may be adjusted. The bent plates 12, 12 prevent the streams of liquid in the several portions from disturbing each other. Of course also a clarifier with vertical longitudinal walls and partitions as shown at Fig. 2 may be modified in a similar manner.

Should the dirty liquid contain oils, fats, in other words matters of a smaller specific weight, preferably longitudinal troughs 15, 15, see Fig. 4, are disposed along the inlet troughs 10 for collecting the oils, fats or the like, which are afterward discharged through convenient tubes not shown, either continuously or periodically, as the case may be. Of course similar oil or fat collecting troughs 15 may be disposed in the clarifier according to Fig. 1 or 2. As the speed of the liquid in the clarifier is extremely small, it will be possible for all the particles of oil, fat and the like to collect at the level and to form a layer, which may equally serve so to say as a filter for retaining all the following particles of oil, fat and the like. This layer of oil etc. can be continuously or periodically discharged with the aid of the collecting troughs 15, 15 and the respective tubes, cocks, valves or the like.

Where so preferred, the clarifier may be made round as shown in Fig. 4, in which case it is provided with an odd number of concentric partitions 3, 3 to form an even number of spaces 4, 5, 6 and 7. The concentric partitions 3, 3 should be secured or supported in any known manner. Pairs of the spaces 4 and 5, 6 and 7 form portions of the clarifier, which may be either assumed as in Figs. 1 and 2 or actual as in Fig. 3. The inlet trough 10 of each portion should be connected with a supply tube on one side and the outlet trough 11 with a discharge tube on the opposite side for reasons which have been explained above. In case the dirty liquid should contain matters of a smaller specific weight, of course concentric collecting troughs 15 may be disposed in the same spaces as the inlet troughs 10, and they should be connected with suitable discharge tubes not shown.

What I claim as my invention, and desire to secure by Letters Patent, is—

1. In a clarifier, the combination with a plurality of inlet and outlet troughs about on the level of the liquid and alternating with each other in compartments and leading to without on opposite sides, every two adjoining compartments forming a portion of the clarifier.

2. In a clarifier, the combination, with an open vessel divided laterally into a number of portions or sections, an inlet and an outlet for each section arranged at the level of the liquid, and a single partition in each section dividing the ingoing from the outgoing fluid, said partition being spaced upwardly from the bottom of said vessel.

3. In a clarifier, the combination with an open vessel, of a plurality of inlet and outlet troughs about on the level of the liquid and alternating with each other and leading to without on opposite sides, and a plurality of partitions dividing said inlet and outlet troughs from each other, every two adjoining compartments forming a portion of the clarifier.

4. In a clarifier, a vessel, an inlet trough in said vessel having one side-edge higher than the other, an outlet trough at approximately the same level as said inlet trough and having its side-edges horizontally alined, and a partition between said troughs and spaced upwardly from the bottom of said vessel.

5. In a clarifier, the combination, with an open vessel, of partitions in said vessel spaced upwardly from its bottom, downwardly curved plates 12 extending between opposite walls of the vessel and connecting alternate partitions at the bottom edges of the latter, said plates forming a means of communication between adjacent compartments, and valves 14 arranged in said plates and extending throughout the length of the vessel.

6. In a clarifier, the combination with an open vessel, of an odd number of partitions in said open vessel above its bottom, an even number of downwardly bent plates each adapted to form a lower communication between two adjoining compartments and provided in its middle with an opening, a plurality of throttle valves adapted to open and to close the openings of said downwardly bent plates, and a plurality of inlet and outlet troughs about on the level of the liquid and alternating with each other in the several compartments and leading to without on opposite sides.

7. In a clarifier, the combination, with an open vessel divided laterally into inlet and outlet compartments, of troughs extending across the upper portion of said vessel, about on the level of the liquid, for collecting suspended matters of small specific weight.

8. In a clarifier, the combination with an open vessel, of an odd number of inclined partitions in said open vessel above its bottom, an even number of downwardly bent plates each adapted to form a lower communication between two adjoining compartments and provided in its middle with an opening, a plurality of throttle valves adapted to open and to close the openings of said downwardly bent plates, a plurality of inlet and outlet troughs about on the level of the liquid and alternating with each other in the several compartments and leading to without on opposite sides, and special troughs about on the level of the liquid in the inlet compartments for collecting suspended matters of a smaller specific weight.

9. In a clarifier, the combination with an open vessel provided with an odd number of partitions above the bottom, of inlet and outlet troughs about on the level of the liquid and alternating with each other in the several compartments of said open vessel and leading to without on opposite sides.

10. In a clarifier, the combination with a rectangular open vessel provided with two opposite inclined walls, of an odd number of inclined partitions in said rectangular vessel above the bottom and parallel to the inclined walls, and inlet and outlet troughs parallel to said inclined partitions about on the level of the liquid and alternating with each other in the several compartments and leading to without on opposite sides.

In testimony whereof I have signed my name to this specification in the presence of two subscribing witnesses.

TADDÄUS LEWICKI.

Witnesses:
  HENRY HASPER,
  C. v. OSSOWSKI.

It is hereby certified that the name of the assignee in Letters Patent No. 853,704, granted May 14, 1907, upon the application of Taddäus Lewicki, of Warsaw, Russia, for an improvement in "Clarifiers," was erroneously written and printed "Carl Hanning," whereas said name should have been written and printed *Carl Hannig;* and that the said Letters Patent should be read with this correction therein that the same may conform to the record of the case in the Patent Office.

Signed and sealed this 4th day of June, A. D., 1907.

[SEAL.]

E. B. MOORE,
*Commissioner of Patents.*